US011305209B2

(12) United States Patent
Hixson et al.

(10) Patent No.: US 11,305,209 B2
(45) Date of Patent: Apr. 19, 2022

(54) ACTUATABLE SURFACE TECHNIQUES (71) Applicant: Universal City Studios LLC, Universal City, CA (US)

(72) Inventors: John Hixson, Orlando, FL (US); Michael Tresaugue, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 196 days.

(21) Appl. No.: 16/748,534

(22) Filed: Jan. 21, 2020

(65) Prior Publication Data
US 2020/0282324 A1 Sep. 10, 2020

Related U.S. Application Data (60) Provisional application No. 62/815,211, filed on Mar. 7, 2019.

(51) Int. Cl.
*A63J 5/02* (2006.01)
*H04N 9/31* (2006.01)
*G03B 21/60* (2014.01)

(52) U.S. Cl.
CPC .............. *A63J 5/02* (2013.01); *H04N 9/3179* (2013.01)

(58) Field of Classification Search
CPC ........ A63G 31/00; A63G 31/02; A63G 31/12; G03B 21/585; G03B 21/60
USPC ............................................ 472/59, 61, 134
See application file for complete search history.

(56) References Cited

U.S. PATENT DOCUMENTS

| 4,339,175 | A | 7/1982 | Astero |
| 9,958,767 | B1 | 5/2018 | Reichow et al. |
| 9,965,034 | B2 | 5/2018 | Levesque et al. |
| 2012/0326989 | A1 | 12/2012 | Verthein et al. |
| 2013/0229396 | A1 | 9/2013 | Huebner |
| 2017/0013251 | A1 | 1/2017 | Thigpen |
| 2017/0136373 | A1* | 5/2017 | Vicente ................. A63G 21/18 |
| 2018/0312173 | A1* | 11/2018 | Hall ....................... A63G 31/00 |

FOREIGN PATENT DOCUMENTS

| CN | 106842798 | 6/2017 |
| DE | 2307880 A1 | 5/1974 |
| SE | 112065 | 10/1944 |

OTHER PUBLICATIONS

PCT/US2020/020223 International Search Report and Written Opinion dated Jun. 2, 2020.
RU 2021128928 Office Action dated Dec. 10, 2021.

\* cited by examiner

*Primary Examiner* — Kien T Nguyen
(74) *Attorney, Agent, or Firm* — Fletcher Yoder P.C.

(57) ABSTRACT

An actuatable surface system may include a plurality of actuatable assemblies. Each actuatable assembly may include a flexible membrane and a bracket at least partially sealing the flexible membrane within the bracket. A fluid conduit is configured to apply fluid to a rear side of the flexible membrane to cause the flexible membrane to form a raised structure relative to the bracket, which in turn causes a surface layer, e.g., a projection surface, to protrude to accommodate the raised structure. A controller is configured to address each individual actuatable assembly to cause the fluid source to apply the fluid to form the raised structure.

23 Claims, 6 Drawing Sheets

ACTUATABLE SURFACE TECHNIQUES

CROSS-REFERENCE TO RELATED APPLICATIONS

This application claims priority to and the benefit of U.S. Provisional Application No. 62/815,211, entitled "ACTUATABLE SURFACE TECHNIQUES," filed Mar. 7, 2019, which is hereby incorporated by reference in its entirety for all purposes.

FIELD OF DISCLOSURE

The present disclosure relates generally to the field of amusement parks. More specifically, embodiments of the present disclosure relate to display systems and methods that permit actuation of surfaces to enhance illusions, e.g., in conjunction with projected images.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Theme or amusement attractions have become increasingly popular. Such attractions may include displayed media intended to create an immersive experience. For example, attractions may feature displayed imagery that presents narrative elements and/or simulates a desired environment of the attraction. However, projected or displayed media (e.g., images, video) is typically distinguishable from more costly physical set pieces. If a guest immediately perceives that the environment is simulated, the desired immersive experience may be diminished. Accordingly, it is recognized that there is a need for improved display systems that create a more immersive and realistic attraction experience.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an actuatable surface system includes a plurality of actuatable assemblies. An individual actuatable assembly includes a flexible membrane; a bracket at least partially sealing the flexible membrane within the bracket; and a fluid conduit configured to apply fluid to a rear side of the flexible membrane to cause the flexible membrane to form a raised structure relative to the bracket. The system also includes a frame holding the plurality of actuatable assemblies and a surface layer coupled to the plurality of actuatable assemblies and in contact with at least a portion of a front side of flexible membranes of the plurality of actuatable assemblies, wherein the front side opposes the rear side and the surface layer is configured to move together with the flexible membranes when the flexible membranes are in the raised structure. The system also includes a controller configured to address each individual actuatable assembly of the plurality of actuatable assemblies to cause fluid to be applied through the fluid conduit to form the raised structure.

In an embodiment, a system includes a projection surface configured to display an image on a viewer side of the projection surface and a projector configured to project the image onto the viewer side of the projection surface. The system also includes a plurality of actuatable assemblies coupled to a rear side of the projection surface, wherein the rear side is opposite the viewer side, and wherein each individual actuatable assembly of the plurality of actuatable assemblies comprises a flexible membrane and a fluid conduit configured to apply fluid to the flexible membrane to cause the flexible membrane to form a raised structure such that a portion of the projection surface protrudes. The system also includes a controller comprising a memory and a processor, wherein the controller is configured to output signals to the projector to cause the image to be projected onto the projection surface, and wherein the controller is configured to provide instructions to a subset of the plurality of actuatable assemblies to form a pattern of respective raised structures based at least in part on the image.

In an embodiment, a method includes the steps of receiving an initiation signal from a controller; controlling a first subset of solenoid valves of a plurality of solenoid valves to open in a first direction based on receiving the initiation signal, wherein each of the plurality of solenoid valves, when open, is fluidically connected to a space at least partially sealed by a respective flexible membrane; applying pressurized fluid through each solenoid valve of the subset open in the first direction to cause the respective flexible membranes of the subset to form raised structures in a first pattern; controlling the subset of solenoid valves of the plurality of solenoid valves to open in a second direction based on receiving a subsequent signal; removing the pressurized fluid through each solenoid valve of the subset open in the second direction to cause the respective flexible membranes of the subset to form planar structures; and controlling one or more light sources to shine light through the respective flexible membranes while in the raised structures and not while in the planar structures.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to an actuatable surface system for a theme park or an amusement park. Amusement parks include attractions or scenery that provide an immersive experience for park guests. As part of the experience, such attractions may employ illusions or simulations to provide the experience of being at a different location and/or surrounded by a different environment. Often such illusions employ painted props, projected or displayed images, and/or light effects. Props and light effects may generate a more realistic environmental feel. However, these elements are typically installed in a fixed configuration and do not lend themselves to frequent updating. Displayed images may provide high levels of image customization that are relatively straightforward to update or change by replacing old media files with new media files. However, users are often pulled out of the immersive experience when the display technology appears too flat or two-dimensional on the display surface, particularly for simulations of environments in which projected displays are anachronistic or out of context.

Provided herein is an actuatable surface system that includes an actuatable surface (e.g., a projection surface) coupled to a plurality of actuatable assemblies, such as individual bumps or bubbles, that are in turn individually addressable to act on portions of the surface to cause those portions protrude outwards in response to control signals. The actuatable surface provides dynamically adjustable structure and/or depth that may be incorporated into set pieces, scenery, props, and/or settings in which traditional display screens or static surfaces are used. Further, the actuatable surface system may enhance displayed images to provide a more realistic surface.

In an embodiment, the protrusion of each individual actuatable assembly may be responsive to control of a series of solenoid air directional and flow control valves. Accordingly, a bump of any size or shape may move across the surface in unison with projected media. In some embodiments, the actuatable surface system facilitates interaction between the patrons and the attraction environment. For example, the disclosed moving or actuatable surface may activate in response to user proximity or user gestures or interactions with the environment. While the present techniques are discussed in the context of amusement or theme parks, it should be understood that the disclosed embodiments may also be applicable to other environments, such as entertainment venues or retail spaces. Further, while certain disclosed embodiments are discussed in the context of a surface that operates in conjunction with projected or displayed images and/or integral light effects, it should be understood that the actuatable assemblies may be implemented to form an adjustable or moving surface that is responsive to control signals as provided herein with or without displaying images on the surface or controlling integral light sources.

Figure 1:
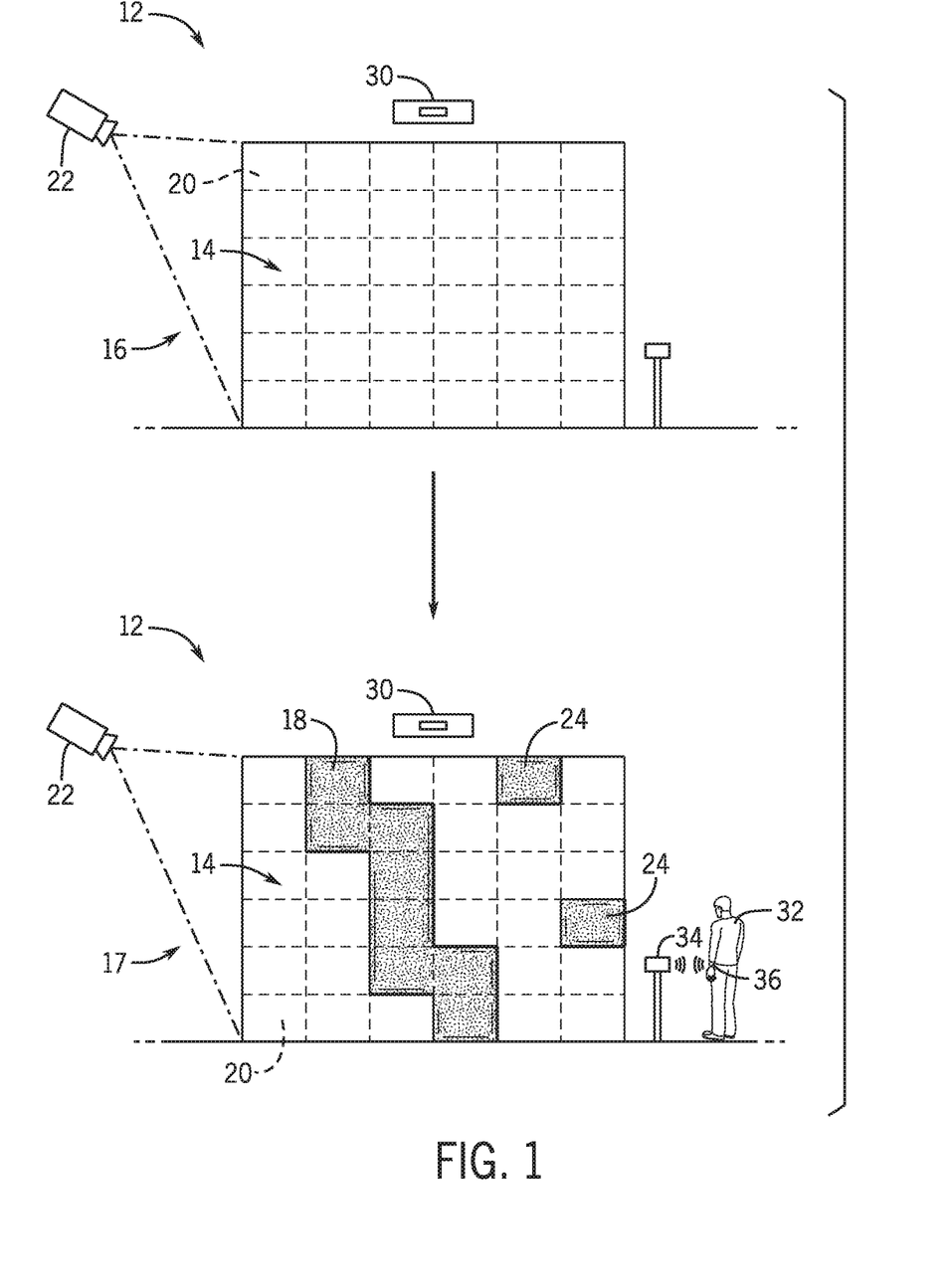
FIG. 1 is a schematic illustration of an actuatable surface system in the context of an amusement park, in accordance with an embodiment of the present disclosure.

In one example, shown in FIG. 1, an environment including an actuatable surface system 12 may include a surface 14 intended to resemble rustic or stone walls upon activation of the illusion. In an inactive configuration 16, the surface 14 may be a generally planar surface with minimal decorative features. Upon activation of the illusion, shown as an active configuration 17, the disclosed actuatable surface system 12 may be used to form a raised vine 18 along the surface 14 using individual actuatable assemblies 20 that cause raised portions to protrude from the surface 14. In this manner, the vine 18 has depth no matter how close or at what angle the viewer is positioned, thus enhancing the effect. Further, in certain embodiments, the coloring and texture of the surface 14 and the vine 18 may be at least in part simulated using projected images from a projector 22, whereby the images have the desired characteristics of color and texture. For example, the projector 22, shown in a front projection configuration, displays images of stone walls onto the surface 14. In addition, the projected images may account for and augment the irregularities and curves of the vine 18, e.g., using projection mapping. Accordingly, in one embodiment, the projected images and the three-dimensional shapes of the actuatable assemblies 20 (shown in the depicted embodiment as the vine 18) may work in concert as part of the illusion.

Because the actuatable surface system 12 permits dynamic adjustment of the three-dimensional features, the vine 18 may appear to move or pulse along the surface 14 in one embodiment. Such an embodiment may also involve the projection of images in which the green contours of the vine 18 change in position on the surface 14 to conform with movement of the vine 18. For example, by causing new protrusions 24 to form and flattening others, the shape and pattern of the vine 18 relative to the surface 14, and the corresponding images, change to create the desired illusion.

These dynamic changes in actuation of the actuatable surface system 12 may be part of a preprogrammed effect operating on a timer. In an embodiment, the actuation may occur in response to user presence or actions. For example, the actuatable surface system 12 may be used in conjunction with one or more user detection features, such as a proximity sensor 30 (e.g., a camera or optical sensor). Upon detection of a user 32, the actuatable surface system 12 may cause the vine 18 to change via activation of individual actuatable assemblies 20 and/or cause the projector 22 to change the set of projected images. In one embodiment, the user detection feature may be a radio frequency communicator 34 configured to communicate with a user-associated device 36 (e.g., a bracelet, a mobile device, a handheld device).

The depicted embodiment showing an illusion of a wall on the surface 14 and a raised vine 18 is by way of example. Other non-limiting arrangements include a responsive actuation in which a user gesture is detected by the proximity sensor 30 and replicated in an actuation pattern on the surface 14. For example, the user 32 standing in front of the surface 14 may wave their arm to send ripples running across the surface 14. A user walking past the surface 14 may be mimicked with a simulated figure marked in raised portions that travel along the surface 14 in step with the user 32. In an embodiment, the ability to cause the actuation and/or the particular nature or pattern of the actuation may be based on user profile information accessed from the communication with the user-associated device 36. Further, the surface 14 may be tactile and responsive to user touch. For example, when employed as a wall in a haunted house, the actuatable surface system 12 may cause the surface 14 to appear as a normal wall but, when touched, the surface 14 may form corresponding raised structures at the location of contact. The contact may be detected by the proximity sensor 30 and mapped to a particular location on the surface 14. In this manner, the surface 14 and its corresponding actuation may act as an Easter egg for a haunted house attraction. Other implementations are also contemplated, such as forming complex or shaped structures (trees, vehicles, etc.) including the actuatable surface system 12. The actuation of certain portions of the surface 14 to be raised relative to a deactivated configuration may be used to simulate the movement of insects or animals along the surface 14, the movement of creatures beneath the surface 14, etc.

Figure 2:
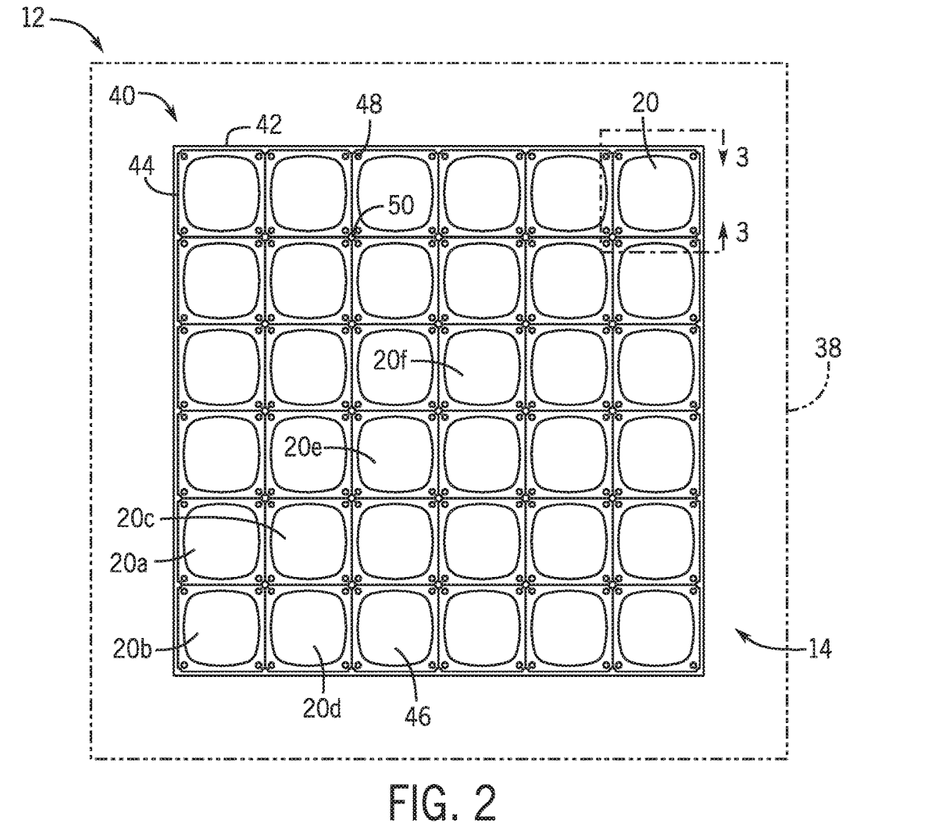
FIG. 2 is a front view of an embodiment of an actuatable surface system formed from an array of actuatable assemblies, in accordance with an embodiment of the present disclosure.

FIG. 2 is a front view of the actuatable surface system 12. The surface 14, or the outer or viewer-side of surface layer 38, is positioned over an array 40 of individual actuatable assemblies 20 that are supported by a frame 42. Each individual actuatable assembly 20 includes a bracket 44 coupled to (e.g., sealing within the bracket) a flexible membrane 46. The flexible membrane 46 may be formed from silicone, rubber, or a conformable material. When actuated, the flexible membrane 46 moves relative to the fixed bracket towards and against the surface layer 38. In turn, the movement of the flexible membrane 46 causes the surface layer 38 to move together with the flexible membrane 46. The surface layer 38 stretches to accommodate the flexible membrane 46, thereby creating a raised structure on the surface 14 as provided herein. Based on the timing and selection of the individual actuatable assemblies 20 that form raised structures, various illusions may be created. For example, a relatively larger raised structure may be created by actuating adjacent actuatable assemblies 20 (e.g., actuatable assemblies 20a-d) to cause their respective flexible membranes 46 to protrude simultaneously. In another example, causing protrusion and then rapid reversal of the protrusion in one or more actuatable assemblies 20 may create a pulsing effect. In another example, a moving or creeping effect may be achieved by actuating adjacent actuatable assemblies 20 to form raised structures in series (actuatable assembly 20b, followed by actuatable assembly 20c, followed by actuatable assembly 20e, followed by actuatable assembly 20f, etc.).

The bracket 44 and the flexible membrane 46 are coupled to one another and/or the frame 42 via mechanical fasteners 48. The brackets 44 are arranged next to one another to form through passages 50 that extend from a rear of the array 40 through to the surface layer 38 to draw the surface 14 against the array 40 and/or the flexible membranes 46. The array 40 is depicted as a regular grid. However, the array 40 may be sized and shaped according to the desired illusion.

Figure 3:
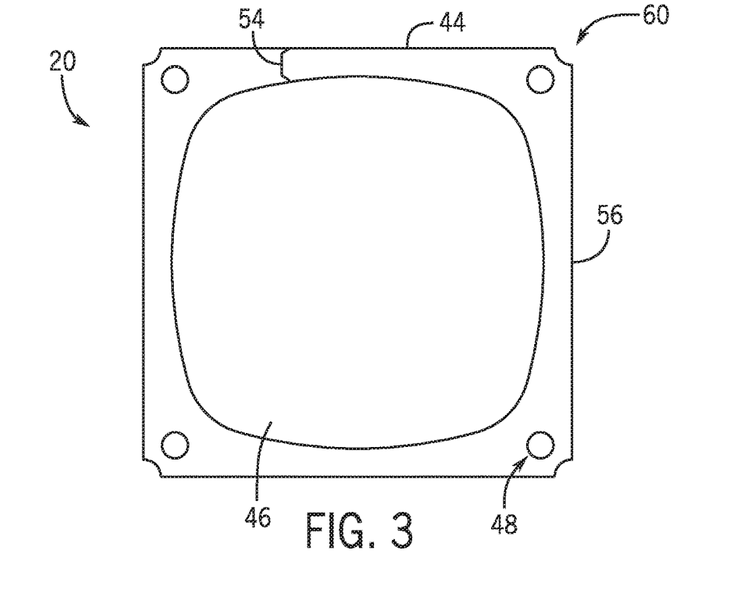
FIG. 3 is a front view of an individual actuatable assembly of the actuatable surface system of FIG. 2.

Further, each individual actuatable assembly 20 of the array, as shown in FIG. 3, may be scaled to be larger or smaller depending on the desired illusion. A larger actuatable assembly 20 may protrude a greater distance from the fixed bracket 44, thus forming a larger raised structure. The bracket 44 may be formed to be relatively thin around its edges such that a distance 54 is less than 10% of a total length of an edge 56 of the bracket 44. Adjacent edges 56 may be in direct contact or almost in contact with one another in the array 40. The through passages 50 may be formed by notches 60 at the corners of each bracket 44. It is contemplated that each individual actuatable assembly 20 is configured to be modular and separable from other actuatable assemblies 20 in the array 40 such that each assembly 20 can be easily replaced when worn.

Figure 4:
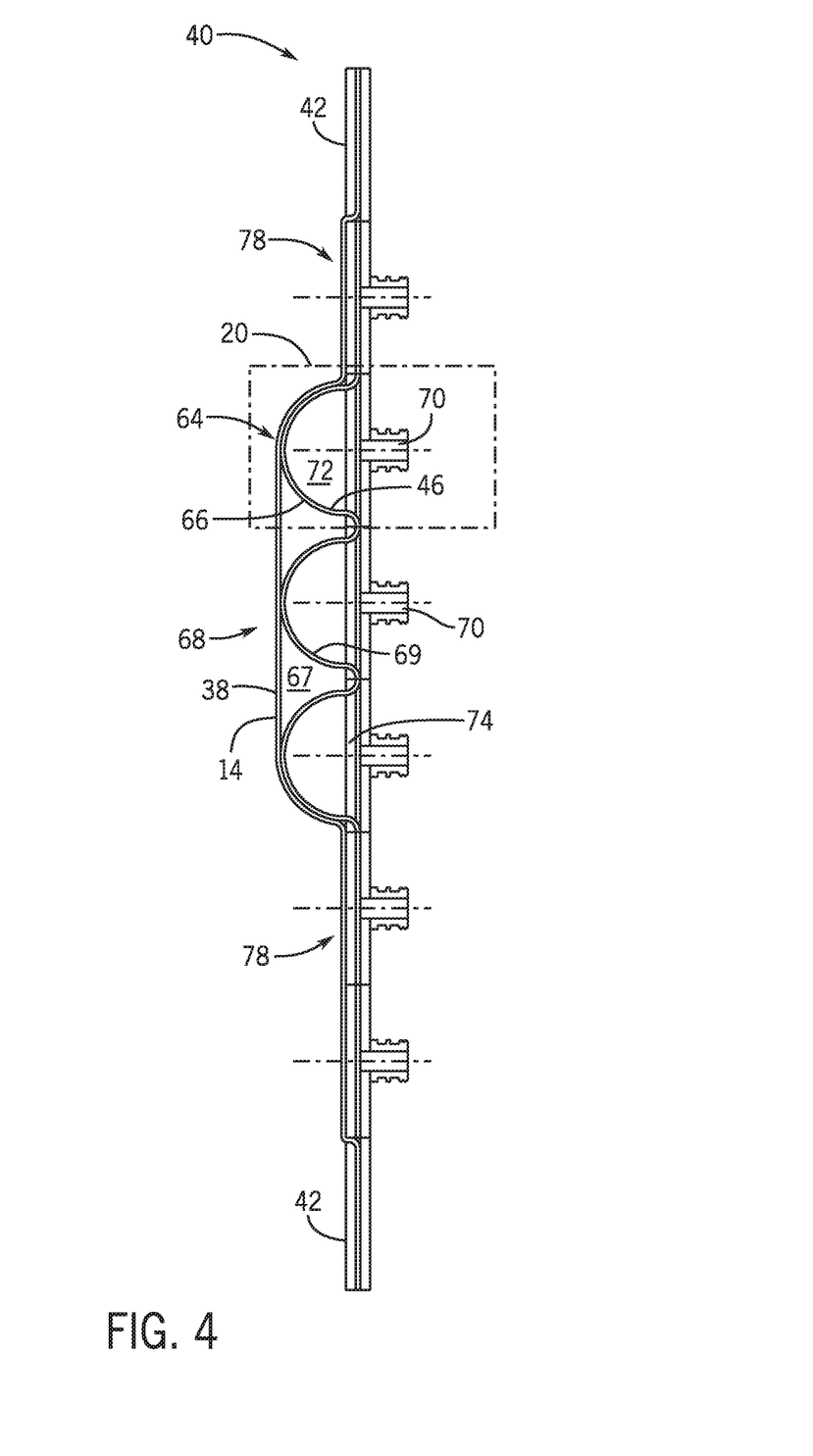
FIG. 4 is a side view of an embodiment of an actuatable surface system, in accordance with an embodiment of the present disclosure.

FIG. 4 is a side view of the array 40 of the actuatable surface system 12 showing different actuation states of individual actuatable assemblies 20. The depicted embodiment shows three raised structures 36 formed from adjacent flexible membranes 46 being in the actuated or protruding position relative to the relatively planar bracket 44. Actuation of the flexible membranes 46 causes a front side 66 of the flexible membrane to push against the surface layer 38. The surface layer 38 is stretched over the three actuated flexible membranes 48 such that a single protrusion or raised structure 68 is visible on the surface 14. That is, certain portions of the front side 66 of the flexible membrane 46 are in direct contact with the surface layer 38 as the surface layer 38 bridges the gaps 67 between individual flexible membranes 46. Accordingly, by adjusting the number of actuatable assemblies 20, the size of the raised structure 68 may be altered. The surface layer 38 may be formed from an elastic material, such as an elastic fabric. The surface layer 38 may be sufficiently opaque to shield the user 32 from viewing the underlying structure of the actuatable assemblies 20. However, in embodiments in which at least some of the actuatable assemblies 20 have integral light sources 74 (e.g., LEDs) that are coupled to the bracket 44, the surface layer 38 may be configured to be at least partially translucent to permit light transmission from the light sources 74 to be visible on the surfaced 14.

In certain embodiments, the actuation of the actuatable assemblies 20 is pneumatic, and actuation to a raised position is accomplished via application of fluid to a rear side 69 of the flexible membrane through a fluid conduit 70. The flexible membrane 46 forms a seal with the bracket 44 such that an interior space 72 retains the fluid in the actuated position. The actuatable assembly 20 may switch from the actuated position to an inactive position 78 that is substantially flush with the respective bracket 44 by removal of the fluid through the fluid conduit 70. In certain embodiments, the removal of the fluid may be incomplete, such that the raised structure 64 is raised to less than 75%, less than 50%, or less than 25% of a fully actuated volume. Accordingly, more complex structures may be created through patterns of full and partial actuation of the actuatable assemblies 20 to create different surface depth levels on the surface 14.

Figure 5:
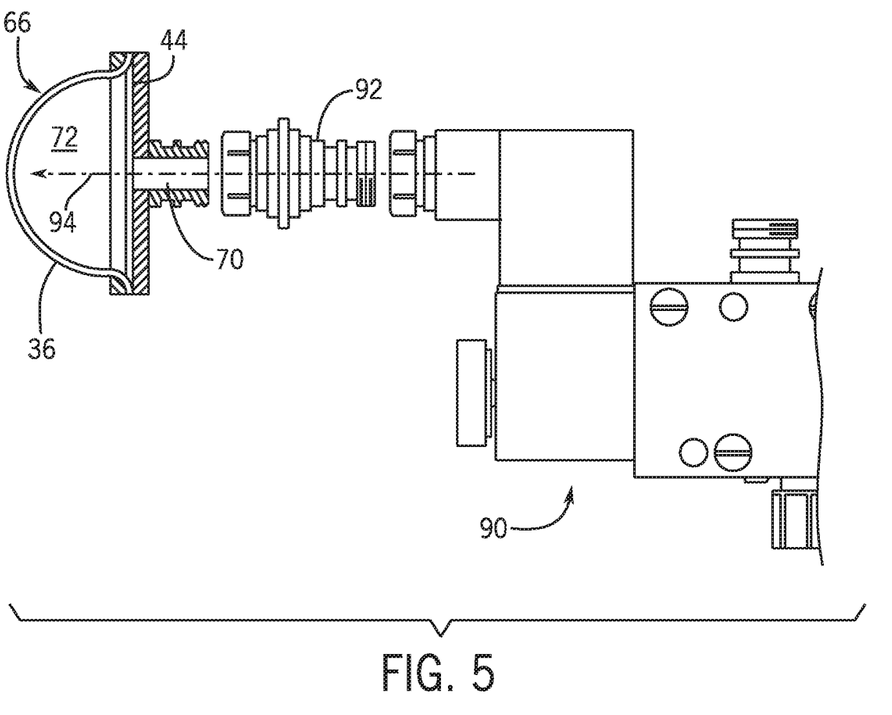
FIG. 5 is a view of a valve assembly, in accordance with an embodiment of the present disclosure.

FIG. 5 is a schematic view of a valve assembly 90. The valve assembly 90 includes pipes or couplings to fluidically couple a fluid source to the fluid conduit 70 in a reversible manner, which is fluidically coupled to the interior space 72 sealed between the flexible membrane and the bracket 44. The depicted valve assembly 90 is a solenoid valve that permits, when open in a first direction, unidirectional air flow into the interior space 72. The valve assembly may also, when open in a second direction, permit rapid removal of air from the interior space 72. The pneumatic valve assembly 90 may permit more rapid inflation and deflation of each actuatable assembly 20, which in turn permits more realistic illusions.

Figure 6:
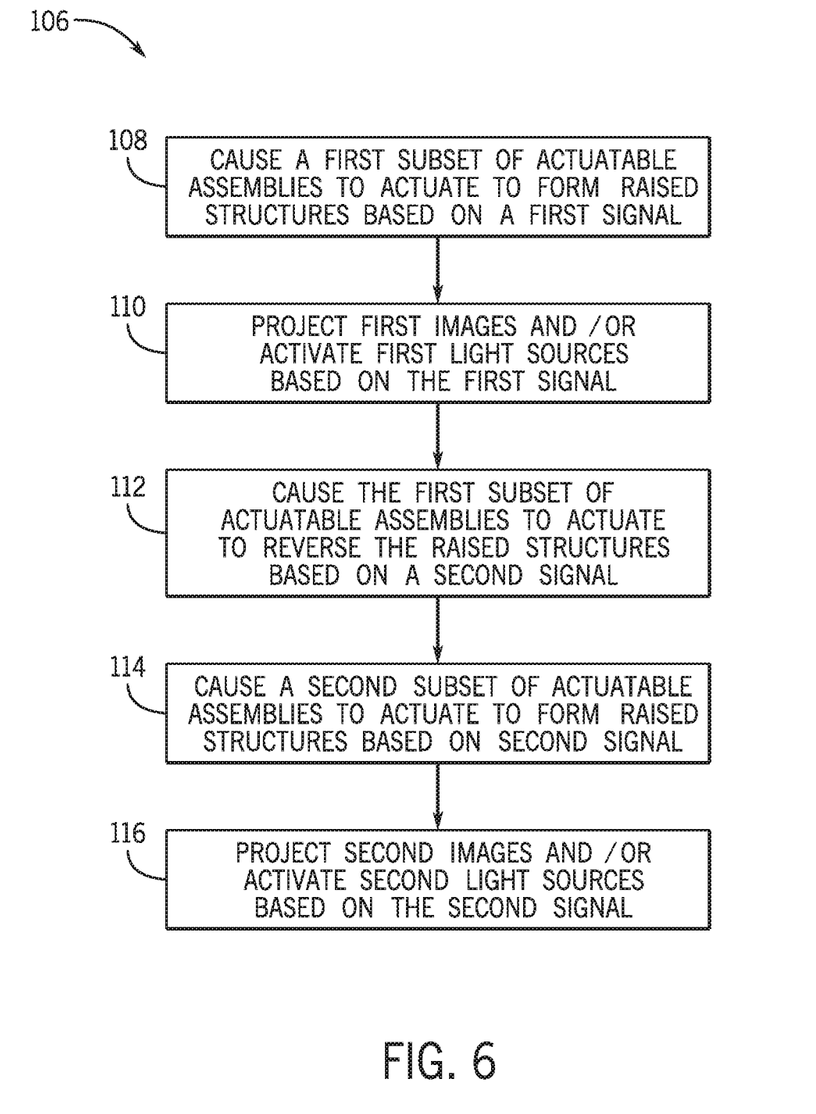
FIG. 6 is a flow diagram of an actuatable surface technique in accordance with an embodiment of the present disclosure.

FIG. 6 is a flow diagram of a method 106 of operating the actuatable surface system 12. The method initiates by actuating a first subset of the actuatable assemblies 20 to form raised structures (e.g., raised structure 64) based on receiving a first signal, e.g., a control signal or an initiation signal (block 108). In certain embodiments, while the surface 14 conforms to raised structures, images are concurrently projected onto the surface and/or integral light sources are activated to shine through the surface 14 of the actuatable surface system 12 (block 110) to enhance the shape formed on the surface 14 by the raised structures. Subsequently, based on a second signal, the first subset of actuatable assemblies 20 are deactivated or are caused to change to a flush configuration from the raised structure (block 112), and a second subset of actuatable assemblies 20 are actuated to form raised structures (block 114). A second set of images are concurrently projected onto the surface and/or a second set of integral light sources are activated to shine through the surface 14 of the actuatable surface system 12 while the second subset is actuated (block 116). In an embodiment, the first subset is different than the second subset. As provided herein, an actuation pattern of the actuatable surface system 12 may include an ordered set of actuation instructions for different actuatable assemblies 20 to cause different raised structures to be formed on the surface 14 over time. The actuation pattern may be aligned to one or both of a sequence of projected images or activation one or more integral light sources.

Figure 7:
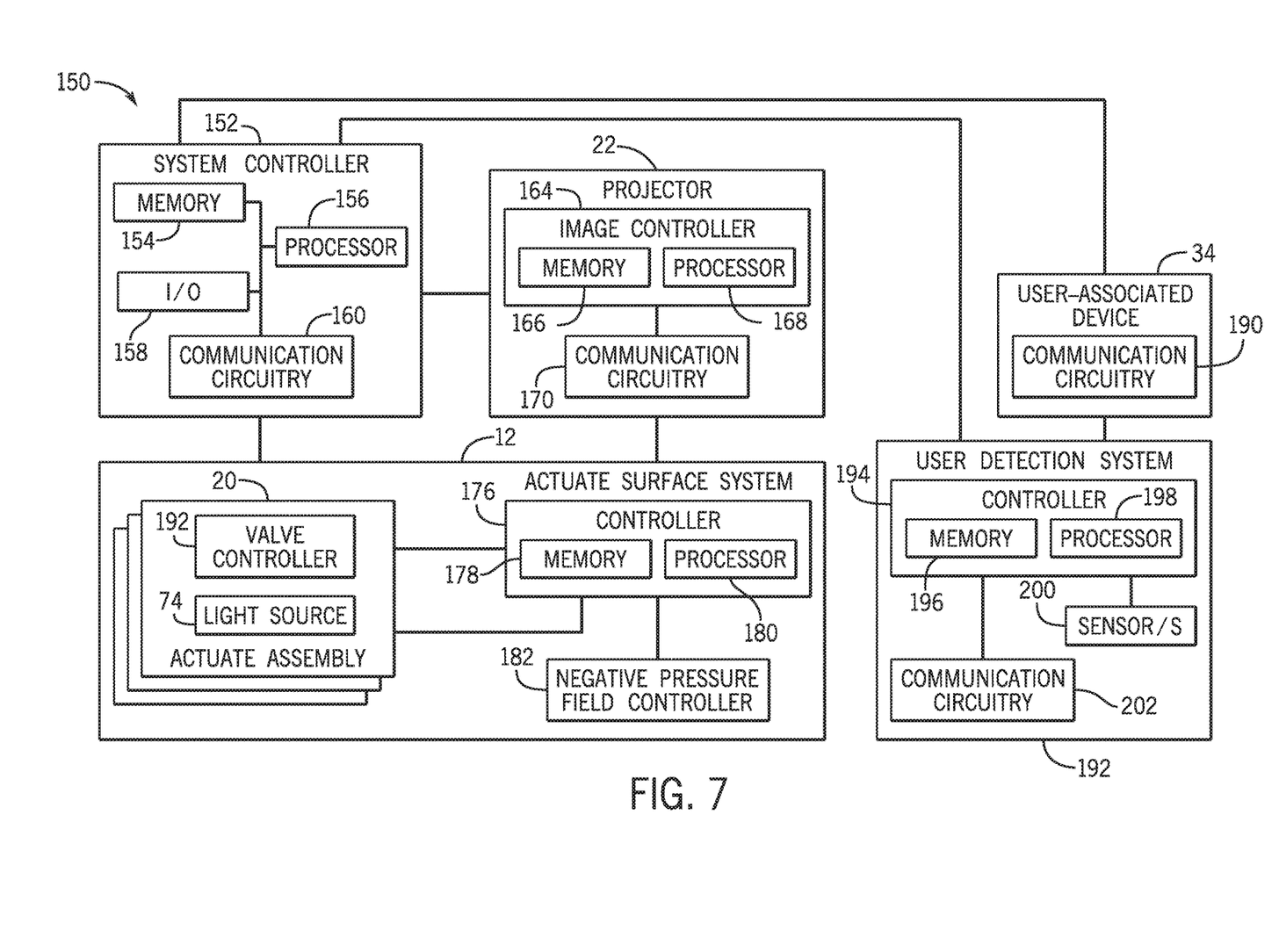
FIG. 7 is a block diagram of the actuatable surface control system, in accordance with an embodiment of the present disclosure.

FIG. 7 illustrates an embodiment of a control system 150 that may be employed within the actuatable surface system 12 to generate the desired illusion. The control system 150 may also control projection of one or more images or image sequences onto the disclosed actuatable surface or projection surface (e.g., surface 14, see FIG. 1) as well as, in some embodiments, coordinate and/or control additional effects that may be provided by the actuatable surface system 12, as discussed in greater detail below. The control system 150 may include a system controller 152 that may be communicatively coupled to the other elements of the actuatable surface system 12. The system controller 152 may control and/or coordinate the other elements of the actuatable surface system 12. The system controller 152 may include a memory 154 and a processor 156. In some embodiments, the memory 154 may include one or more tangible, non-transitory, computer-readable media that store instructions executable by the processor 156 and/or data to be processed by the processor 156. For example, the memory 154 may include random access memory (RAM), read only memory (ROM), rewritable non-volatile memory such as flash memory, hard drives, optical discs, and/or the like. Additionally, the processor 156 may include one or more general purpose microprocessors, one or more application specific processors (ASICs), one or more field programmable logic arrays (FPGAs), or any combination thereof. Further, the memory 154 may store instructions executable by the processor 156 to perform the methods and control actions described herein for the actuatable surface system 12. The disclosed features of the memory 154 and the processor 156 may be shared by other memory or processor devices as provided herein.

The system controller 152 may further include one or more input/output (I/O) devices 158 that may facilitate communication between the system controller 152 and a user (e.g., operator). For example, the I/O devices may include a button, a keyboard, a mouse, a trackpad, and/or the like to enable user interaction with the system controller 52 and the control system 150. Additionally, the I/O devices 158 may include an electronic display to facilitate providing a visual representation of information, for example, via a graphical user interface (GUI), and application interface, text, a still image, and/or video content. Further, the system controller 152 may be configured to communicate with other elements of the actuatable surface system 12 (or the system 150) over wired or wireless communication paths. In some embodiments, the system controller 152 may include communication circuitry 160 that may facilitate transmission of information between the system controller 152 and the other elements of the control system 50 and the actuatable surface system 12, such as the projector 22. The disclosed features of the memory 154, the processor 156, and/or the communication circuitry 160 may be shared by other memory or processor devices as provided herein.

The projector 22 may be communicatively coupled to the system controller 152 and may project images onto the surface 14 of the actuatable surface system 12 such that it is presented to the user. Additionally, the projector 22 may be communicatively coupled to some or all of the other elements of the actuatable surface system 12. The projector 22 may include or be coupled to an image controller 160, which may process the images or update the images using one or more techniques to provide the desired illusion. The image controller 164 may include a memory 166 and a processor 168. In some embodiments, the image controller 164 may be associated with the projector 22, as in the illustrated embodiment, or the image controller 164 may be disposed remotely from the projector 22. Alternatively, in some embodiments, some or all of the image processing techniques of the image controller 164 may be performed by the system controller 152. The projector 22 may include communications circuitry 170.

The actuatable surface system 12 may be communicatively coupled to the system controller 152, as well as in some embodiments, other elements of the system 150. The actuatable surface system 12 may include a controller 176 that may control actuation of the actuatable assemblies 20 to protrude from the surface 14. The haptic controller 176 may include a memory 178 and a processor 180. In operation, in some embodiments, the controller 176 may be configured to determine locations on the surface 14 that correspond to projected images from the projector 22 and at which raised structures are to be formed based on the image or image sequence and any animation of the projected image The controller 176 may be configured to be determine an actuation pattern to provide based at least in part on the images and may coordinate sending signals to the actuatable assemblies 20 to activate particular actuatable assemblies 20 (e.g., a subset of the actuatable assemblies 20). For example, when the actuatable assemblies 20 are pneumatically driven, the control signals may drive activation of respective valves via valve controller 182. Additionally or alternatively, in some embodiments, the actuatable surface system 12 may include an integrated light effects system that may be integrated into the actuatable assemblies 20. The controller 176 may be configured to drive one or more light sources 74 that may be coordinated to be activated in concert with the projected images and/or the actuation of the actuatable assemblies 20. In some embodiments, some or all of the processes performed by the controller 176 may be performed by the system controller 152. The controller 176 may also control application of a negative pressure field via a negative pressure field controller 182 that controls application of a negative pressure to the surface layer 38 such that the surface 14 is drawn against the raised and/or deactivated actuatable assemblies 20 to form finer detail in the illusion.

Initiation of an actuation pattern of the actuatable surface system 12 may be based on user presence and/or actions. In an embodiment, a user-associated device 34 communicates a user signal, using communication circuitry 190 (e.g., a radiofrequency transmitter), with a user detection system 192. The user detection system may detect the user-associated device via communication circuitry 202 (e.g., a radiofrequency receiver) and, based on the received user signal, transmit the user signal to the system controller 152. The system controller 152 may access user identification information based on the user signal. Based on the user identification information, the system controller 152 may communicate instructions to the actuatable surface system 12 to initiate an actuation pattern stored in the memory 178 that is associated with a characteristic of the user identification information. For example, if the user has selected a particular avatar or symbol as part of a user profile, the actuation pattern may be related the avatar. In other embodiments, the user detection system 192 may detect the user via one or more sensors 200, such as camera or optical sensors. The user detection system 192 may also be capable of on-board processing to provide user detection information directly to the actuatable surface system 12 via a resident controller 194 and memory 196 and processor 198.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An actuatable surface system comprising:
a plurality of actuatable assemblies, wherein an individual actuatable assembly of the plurality of actuatable assemblies comprises:
a flexible membrane;
a bracket at least partially sealing the flexible membrane within the bracket; and
a fluid conduit configured to apply fluid to a rear side of the flexible membrane to cause the flexible membrane to form a raised structure relative to the bracket;
a frame holding the plurality of actuatable assemblies;
a surface layer coupled to the plurality of actuatable assemblies and in contact with at least a portion of a front side of the flexible membranes of the plurality of actuatable assemblies, wherein the front side opposes the rear side and the surface layer is configured to move together with the flexible membranes when the flexible membranes are in the raised structure; and
a controller configured to address each individual actuatable assembly of the plurality of actuatable assemblies to cause fluid to be applied through the fluid conduit to form the raised structure.

2. The actuatable surface system of claim 1, wherein the controller is configured to control initiation of an actuation pattern to cause a first subset of the plurality of actuatable assemblies to form the raised structure at a first time point and a second subset of the plurality of actuatable assemblies to form the raised structure at a second time point.

3. The actuatable surface system of claim 2, wherein the actuation pattern is initiated in response to the controller receiving a signal from a proximity sensor indicative of a presence of a user.

4. The actuatable surface system of claim 2, comprising wireless communication circuitry configured to receive a wireless signal from a user device, wherein the actuation pattern causing a subset of the plurality of actuatable assemblies to form respective raised structures is initiated in response to the controller receiving the wireless signal from the user device.

5. The actuatable surface system of claim 4, wherein the controller is configured to control a process of verifying that a user associated with the user device has permission to initiate the actuation pattern before initiating the actuation pattern.

6. The actuatable surface system of claim 4, wherein the user device is a handheld device, a mobile device, or a user-worn device.

7. The actuatable surface system of claim 1, wherein the controller is configured to cause the fluid conduit to apply a negative pressure to draw the flexible membrane towards an inlet of the fluid conduit to reverse formation of the raised structure.

8. The actuatable surface system of claim 1, wherein a default state of each actuatable assembly is substantially flush with or recessed within the bracket.

9. The actuatable surface system of claim 1, wherein the fluid conduit extends through a portion of the bracket.

10. The actuatable surface system of claim 1, wherein each actuatable assembly comprises a light emitting diode coupled to the bracket.

11. The actuatable surface system of claim 1, wherein the fluid conduit is coupled to a solenoid valve addressable by the controller to cause the solenoid valve to apply the fluid.

12. The actuatable surface system of claim 1, wherein the plurality of actuatable assemblies are arranged in an array in which individual brackets of the plurality of actuatable assemblies are positioned adjacent to at least one other bracket.

13. The actuatable surface system of claim 12, wherein the individual brackets are arranged to form a plurality of gaps or notches to permit a negative pressure field to be applied through the plurality of gaps or notches to the surface layer from a rear side of the individual brackets to draw the surface layer towards the individual brackets.

14. The actuatable surface system of claim 1, wherein the surface layer is formed from an elastic material.

15. A system comprising:
a projection surface configured to display an image on a viewer side of the projection surface;
a projector configured to project the image onto the viewer side of the projection surface;
a plurality of actuatable assemblies coupled to a rear side of the projection surface, wherein the rear side is opposite the viewer side, and wherein each individual actuatable assembly of the plurality of actuatable assemblies comprises a flexible membrane and a fluid conduit configured to apply fluid to the flexible membrane to cause the flexible membrane to form a raised structure such that a portion of the projection surface protrudes; and a controller comprising a memory and a processor, wherein the controller is configured to output signals to the projector to cause the image to be projected onto the projection surface, and wherein the controller is configured to provide instructions to a subset of the plurality of actuatable assemblies to form a pattern of respective raised structures based at least in part on the image.

16. The system of claim 15, wherein the controller is configured to cause the projector to transition from projecting the image to projecting one or more additional images to generate an animation effect, and wherein the controller is configured to update the instructions to a different subset of the plurality of actuatable assemblies to form a new pattern of respective raised structures based at least in part on the one or more additional images.

17. The system of claim 15, wherein the plurality of actuatable assemblies are arranged in an array.

18. The system of claim 17, wherein the array comprises a plurality of through passages, and wherein the system further comprises a negative pressure source configured to apply a negative pressure field to the projection surface to draw the projection surface towards the flexible membrane.

19. The system of claim 15, wherein the projection surface is formed from an elastic material that stretches to accommodate the respective raised structures.

20. A method, comprising:
receiving an initiation signal from a controller;
controlling a first subset of solenoid valves of a plurality of solenoid valves to open in a first direction based on receiving the initiation signal, wherein each of the plurality of solenoid valves, when open, is fluidically connected to a space at least partially sealed by a respective flexible membrane;
applying a pressurized fluid through each solenoid valve of the first subset opened in the first direction to cause the respective flexible membranes of the first subset to form raised structures in a first pattern;
controlling the first subset of solenoid valves of the plurality of solenoid valves to open in a second direction based on receiving a subsequent signal;
removing the pressurized fluid through each solenoid valve of the first subset open in the second direction to cause the respective flexible membranes of the subset to form planar structures; and
controlling one or more light sources to shine light through the respective flexible membranes while in the raised structures and not while in the planar structures.

21. The method of claim 20, comprising controlling a second subset of solenoid valves of the plurality of solenoid valves to open in a first direction based on receiving the subsequent signal and applying pressurized fluid through each solenoid valve of the second subset opened in the first direction to cause the respective flexible membranes of the second subset to form raised structures in a second pattern.

22. The method of claim 20, comprising causing a negative pressure field through passages positioned between the respective flexible membranes to draw an elastic projection surface towards the respective flexible membranes.

23. The method of claim 20, comprising receiving a proximity signal indicative of proximity of a user and transmitting the initiation signal based on the proximity signal.

* * * * *